(12) United States Patent
Maitani et al.

(10) Patent No.: US 8,297,845 B2
(45) Date of Patent: Oct. 30, 2012

(54) SLIDING BEARING FOR INTERNAL COMBUSTION ENGINE

(75) Inventors: Shinya Maitani, Inuyama (JP); Osamu Ishigo, Inuyama (JP)

(73) Assignee: Daido Metal Company, Ltd., Nagoya (JP)

( * ) Notice: Subject to any disclaimer, the term of this patent is extended or adjusted under 35 U.S.C. 154(b) by 335 days.

(21) Appl. No.: 12/761,466

(22) Filed: Apr. 16, 2010

(65) Prior Publication Data

US 2010/0316312 A1 Dec. 16, 2010

(30) Foreign Application Priority Data

Jun. 15, 2009 (JP) ................. 2009-142195

(51) Int. Cl.
*F16C 33/10* (2006.01)

(52) U.S. Cl. ...................................................... 384/288

(58) Field of Classification Search .................. 384/286, 384/287, 288, 291, 294, 429, 430
See application file for complete search history.

(56) References Cited

U.S. PATENT DOCUMENTS

| | | | |
|---|---|---|---|
| 5,009,522 A * | 4/1991 | Hahn | 384/288 |
| 7,234,870 B2 * | 6/2007 | Kitahara et al. | 384/288 |
| 2005/0047689 A1 * | 3/2005 | Yamazaki et al. | 384/288 |
| 2005/0196084 A1 * | 9/2005 | Kitahara et al. | 384/288 |
| 2005/0263125 A1 * | 12/2005 | Terada et al. | 123/196 R |
| 2010/0046869 A1 * | 2/2010 | Matsuyama | 384/288 |
| 2011/0058761 A1 * | 3/2011 | Ishigo et al. | 384/288 |

FOREIGN PATENT DOCUMENTS

| | | |
|---|---|---|
| JP | 4219521 A | 8/1992 |
| JP | 8277831 A | 10/1996 |
| JP | 2005069283 A | 3/2005 |
| JP | 2005076755 A | 3/2005 |
| JP | 2008020028 A | 1/2008 |
| JP | 2008095858 A | 4/2008 |

* cited by examiner

*Primary Examiner* — Thomas R Hannon
(74) *Attorney, Agent, or Firm* — Browdy and Neimark, PLLC

(57) ABSTRACT

Disclosed is a sliding bearing for an internal combustion engine which is used as a cylindrical bearing by combining a pair of semi-cylindrical bearings. An axial groove A exists between the circumferential end surface and an opposite circumferential end surface. A circumferential oil groove and the axial groove A communicate with each other, depths of the circumferential oil groove in the communication portion and the axial groove A in the circumferential end surfaces differ from each other, and a groove bottom of the circumferential oil groove is located at a position displaced to a side of the inner circumferential bearing surface from the groove bottom of the axial groove A. A cross-sectional area of the circumferential oil groove in the communication portion is larger than a cross-sectional area of the axial groove A.

7 Claims, 4 Drawing Sheets

SLIDING BEARING FOR INTERNAL COMBUSTION ENGINE

INCORPORATION BY REFERENCE

The present application claims priority from Japanese application JP Patent Application Ser. No. 2009-142195 filed on Jun. 15, 2009, the content of which is hereby incorporated by reference into this application.

BACKGROUND OF THE INVENTION (1) Field of the Invention

The present invention relates to a sliding bearing for an internal combustion engine in which a pair of semi-cylindrical bearings is combined with each other into a cylindrical shape to support a crankshaft.

(2) Description of the Related Art

Conventionally, a sliding bearing formed into a cylindrical shape by combining two semi-cylindrical bearings is used for a crankshaft. A circumferential oil groove is formed on a bearing inner surface of at least one of a pair of semi-cylindrical bearings, and oil is supplied to an outer circumferential surface of a crankpin via the circumferential oil groove. The circumferential oil groove is generally formed to have a constant depth (see JP-A-8-277831).

Meanwhile, in recent years, it has been proposed to form a narrowed portion in which the sectional area of the oil groove is reduced toward the end portion of the bearing from the bearing central portion in order to decrease the leakage amount of lubricant oil from the bearing end portion in response to reduction in size of oil pump for supplying the lubricant oil (see JP-A-4-219521 and JP-A-2005-69283).

BRIEF SUMMARY OF THE INVENTION

With regard to supply of lubricant oil to a sliding bearing for an internal combustion engine, the lubricant oil is first supplied from an outside of the sliding bearing for the crankshaft into the circumferential oil groove which is formed on the inner surface of the sliding bearing for the crankshaft. Next, the lubricant oil is supplied to the sliding surface of the sliding bearing for the crankshaft, and the sliding surface of a sliding bearing for a crankpin.

At the time of the initial operation of an internal combustion engine, foreign substances remaining in the lubricant oil path tends to enter the lubricant oil which is supplied to the circumferential groove of the sliding bearing for the crankshaft. The foreign substances mean metalwork chippings produced during the cutting work of the oil path, molding sand used in casting process, and the like. Foreign substances accompany the flow of the lubricant oil due to the rotation of the crankshaft. In the conventional sliding bearing for an internal combustion engine, foreign substances are discharged together with the lubricant oil through clearance portions in a crush relief, a chamfer, and the like which are formed at the bearing circumferential end portion. However, since the rotational speed of the crankshaft in the internal combustion engines has been increased recently, the inertia force becomes large which acts on the foreign substances having specific gravities larger than that of the lubricant oil (foreign substances move forward along the circumferential direction by the inertia force). Therefore, the foreign substances are not discharged from the clearance portion in the combined end surfaces of the sliding bearing (combined end surfaces of a pair of semi-cylindrical bearings), and enter the sliding surface of the sliding bearing (the other semi-cylindrical bearing) which does not have an oil groove. This increases the possibility of damage of the bearing sliding surface due to the foreign substances.

Meanwhile, sliding bearings are proposed in which a narrowed portion is formed in the oil groove in the circumferential end portion of a semi-cylindrical bearing, in order to decrease the leakage amount of the lubricant oil from the circumferential end portion of the bearing (see JP-A-4-219521 and JP-A-2005-69283). Studying these sliding bearings from the viewpoint of the aforementioned foreign substances, there is the problem that the flow velocity of the lubricant oil increases at the downstream of the narrowed portion with respect to the flowing direction of the lubricant oil, and then the aforementioned inertia force which acts on the foreign substances accompanying the lubricant oil becomes larger correspondingly, and this further increases the possibility of the entry of the foreign substances to the bearing sliding surface.

Thus, an object of the present invention is to provide a sliding bearing for an internal combustion engine, which is excellent in capability of discharging foreign substances.

In view of the above described object, according to a first aspect of the present invention, there is provided a sliding bearing for an internal combustion engine, composed of a pair of semi-cylindrical bearings combined with each other into a cylindrical body to support a crankshaft, a circumferential oil groove being formed to extend in a circumferential direction on an inner circumferential surface of one of the semi-cylindrical bearings. The circumferential oil groove includes a central portion in the center of a circumferential length of the one of the semi-cylindrical bearings. Along an overall axial length of at least one of both circumferential end surfaces of the one of the semi-cylindrical bearings, facing in a same direction as a rotational direction of the crankshaft, an axial groove exists between the circumferential end surface and an opposite circumferential end surface of the other semi-cylindrical bearing. The axial groove is defined by a slant surface formed over an overall axial width of the sliding bearing, along the inner circumferential surface and the one of the circumferential end surfaces of at least one of the semi-cylindrical bearings. The circumferential oil groove and the axial groove communicate with each other, depths of the circumferential oil groove in the communication portion and the axial groove in the one of the circumferential end surfaces being different from each other, and a groove bottom of the circumferential oil groove being located at a position displaced to a side of the inner circumferential bearing surface from a groove bottom of the axial groove. And, a cross-sectional area of the circumferential oil groove in the communication portion is larger than a cross-sectional area of the axial groove.

In the first embodiment of the present invention, a relationship of a groove width (L2) and a groove depth (L1) of the axial groove satisfies L2<2×L1.

In the second embodiment of the present invention, a relationship of a groove width (L2) and a groove depth (L1) of the axial groove satisfies L2<L1.

In the third embodiment, the cross-sectional area of the axial groove in the communication portion is less than ½ of the cross-sectional area of the circumferential oil groove.

In the fourth embodiment of the present invention, the circumferential oil groove is formed on the inner circumferential bearing surface of the one of the semi-cylindrical bearings over an overall circumferential length of the inner circumferential bearing surface, and the shapes of the circumferential oil groove and the axial groove are formed plane-symmetrically on the basis of a phantom plane including an axial line of the sliding bearing and passing through a position dividing the circumferential length of the one of the semi-cylindrical bearings into two equal lengths.

In the fifth embodiment of the present invention, the groove depth of the circumferential oil groove is formed to be a maximum at the central portion in the center of the circumferential length and to be gradually smaller toward both the circumferential end surfaces, and thereby, the cross-sectional area of the circumferential oil groove is a maximum at the central portion in the center of the circumferential length, and becomes gradually smaller toward both the circumferential end surfaces.

In the sixth embodiment of the present invention, the axial groove includes a crush relief provided along the inner circumferential bearing surface adjacent to each of the circumferential end surfaces of the pair of semi-cylindrical bearings. Here, the crush relief means a region with reduced wall thickness, which is formed by reducing the bearing wall thickness at a portion near the circumferential end surfaces of the pair of semi-cylindrical bearings at the side of the inner circumferential surface. The crush relief has a curvature center differing from a curvature center of the inner circumferential bearing surface. The region with reduced wall thickness indicates a region with the thickness reduced toward the circumferential end surface, as defined in SAE J506 (see item 3. 26, and item 6. 4) and DIN1497, Article 3. 2. The meaning of the words "the axial groove includes a crush relief" is that the axial groove is formed with the depth of the groove which exceeds the amount of thickness reduction in the crush relief from the phantom inner circumferential bearing surface.

According to the second aspect of the present invention, there is provided a semi-cylindrical bearing used as a component of the sliding bearing, the semi-cylindrical bearing having the circumferential oil groove, and defining the axial groove in cooperation with a mating semi-cylindrical bearing which is combined with the semi-cylindrical bearing as a pair.

Operation (1) During operation of the internal combustion engine, the lubricant oil is supplied into the circumferential oil groove in the substantially central portion in the circumferential direction of the one of the semi-cylindrical bearings, and flows with rotation of the crankshaft toward the bearing circumferential end portion mainly along the inside of the circumferential oil groove and along the inner circumferential bearing surface (that is, the bearing sliding surface) of the semi-cylindrical bearing. The lubricant oil reaches the bearing circumferential end portion and hits the bearing circumferential end surface of the other semi-cylindrical bearing in which the circumferential oil groove is not formed. Then, the lubricant oil changes the direction to the orthogonal direction in the communication portion of the circumferential oil groove and the axial groove to flow in the axial groove, and then flows out to the outside of the bearing from the axial end portion of the sliding bearing.

During this operation, a foreign substance accompanying the lubricant oil flows inside the circumferential oil groove and the axial groove together with the lubricant oil, and is discharged to the outside of the bearing from the axial end portion of the sliding bearing. The foreign substance having large specific gravity compared with the lubricant oil tends to roll and move along the groove bottoms of the circumferential oil groove and the axial groove.

In this case, the depth of the circumferential oil groove in the communication portion and the depth of the axial groove in the circumferential end surface of the one of the semi-cylindrical bearings are different from each other, and the groove bottom of the circumferential oil groove is located at the position displaced to the side of the inner circumferential bearing surface from the groove bottom of the axial groove (more specifically, the groove depth of the axial groove is made larger as compared with the groove depth of the circumferential oil groove). Therefore, the foreign substance tends to move along the groove bottom and directly enters the axial groove in the communication portion. Therefore, the foreign substance is hardly influenced by the flow with rotation of the crankshaft of the lubricant oil which flows in the circumferential direction along the inner circumferential bearing surface. The possibility is reduced that the foreign substance is forced out of the axial groove to move to the inner circumferential bearing surface and thereby enters between the sliding surfaces of the sliding bearing and the crankshaft. When the foreign substance enters between the sliding surfaces of the sliding bearing and the crankshaft, the sliding surfaces are likely to be damaged by the rolling foreign substance. Therefore, the behavior of the foreign substance in the sliding bearing of the present invention as described above is advantageous. Assuming that the groove bottom of the axial groove in the communication portion is located at the position displaced to the side of the inner circumferential bearing surface from the groove bottom of the circumferential oil groove in the circumferential end surface of the semi-cylindrical bearing, the foreign substance which reaches the communication portion cannot directly enter the inside of the axial groove. This is because the open portion of the circumferential groove is opened at the circumferential end surface of the one semi-cylindrical bearing in which the circumferential groove is formed, and a (groove bottom side) part of the open portion (namely, the groove end) of the circumferential oil groove is blocked by the circumferential end surface of the other semi-cylindrical bearing in which the circumferential oil groove is not formed. The foreign substance enters the axial groove after floating up to the side of the inner circumferential bearing surface by the upward flow of the lubricant oil generated in the blocked portion. Therefore, the foreign substance is carried by the flow of the lubricant oil flowing in the circumferential direction with rotation of the crankshaft before entering the axial groove, and easily enters between the sliding surfaces of the sliding bearing and the crankshaft. Further, the cross-sectional area of the circumferential oil groove in the communication portion is made larger than the cross-sectional area of the axial groove. Therefore, the flow velocity of the lubricant oil in the axial groove is higher than that of the lubricant oil in the circumferential oil groove, and the foreign substance is hardly influenced by the flow of the lubricant oil which flows with rotation of the crankshaft in the circumferential direction along the inner circumferential bearing surface. The possibility is reduced that the foreign substance is forced out of the axial groove to move to the inner circumferential bearing surface and thereby enters between the sliding surfaces of the sliding bearing and the crankshaft (also refer to the third embodiment of the present invention).

(2) In the first and the second embodiments of the present invention, the relationship of the groove width ($L2$) and the groove depth ($L1$) of the axial groove is set to satisfy $L2<2\times L1$, or $L2<L1$. According to this configuration, the foreign substance rolling along the groove bottom of the axial groove is hardly influenced by the flow of the lubricant oil flowing with rotation of the crankshaft in the circumferential direction along the inner circumferential bearing surface. Therefore, the possibility is reduced that the foreign substance is forced out of the axial groove to move to the inner circumferential bearing surface and thereby enters between the sliding surfaces of the sliding bearing and the crankshaft. In the case of $L2 \geqq 2\times L1$, even if the cross-sectional area of the axial groove is made smaller than the cross-sectional area of the circumferential oil groove to increase the velocity of the oil flow in the axial groove in order to enhance the effect of foreign substance discharge, the foreign substance is easily influenced by the lubricant oil flowing by rotation of the crankshaft in the circumferential direction in the vicinity of the crankshaft surface. So, it becomes difficult to discharge the foreign substance to the outside of the bearing along the axial groove. Further, in the case of about L2=3×L1, the effect of foreign substance discharge can hardly be expected. Further, in the case of L2≧3×L1, movement of the foreign substance to the inner circumferential bearing surface is promoted.

(3) In the fourth embodiment of the present invention, the circumferential oil groove is formed on the inner circumferential surface of the one of the semi-cylindrical bearings over the overall circumferential length of the inner circumferential bearing surface. The shapes of the circumferential oil groove and the axial groove are formed plane-symmetrically on the basis of a phantom plane including the axial line of the sliding bearing and passing through the position dividing the circumferential length of the one of the semi-cylindrical bearings into two equal lengths. The trouble can be eliminated by this configuration that the pair of semi-cylindrical bearings are assembled erroneously to the crankcase, while such trouble is likely to occur in the case of the embodiment in which the shapes of the circumferential oil groove and the axial groove are plane-asymmetrical. In other words, the operational effect expected in the present invention cannot be obtained in the configuration in which the fourth embodiment is not adopted, if the circumferential end surface with the axial groove of the one of the semi-cylindrical bearings is set so as to face the opposite side from the rotational direction of the crankshaft when the pair of semi-cylindrical bearings is combined with each other to support the crankshaft. However, when the one of the semi-cylindrical bearings is adopted to be in the symmetrical shape as in the fourth embodiment, excessive attention does not have to be paid during the assembly of the pair of semi-cylindrical bearings. Therefore, operation efficiency can be improved.

(4) In the fifth embodiment of the present invention, the groove depth of the circumferential oil groove is formed to be the maximum at the central portion in the center of the circumferential length of the one of the semi-cylindrical bearings and to be gradually smaller toward both the circumferential end surfaces. In this configuration, it is easy to position the open portion (namely, the groove end) of the circumferential oil groove of the one of the semi-cylindrical bearings in the axial groove. Therefore, this prevents the trouble that a part of the open portion blocked by the circumferential end surface of the mating semi-cylindrical bearing generate an upward flow of the lubricant oil, and the foreign substances are floated up, and carried by the lubricant oil flowing in the circumferential direction with the rotation of the crankshaft, and moved to the inner circumferential bearing surface.

DETAILED DESCRIPTION OF THE INVENTION

Hereinafter, embodiments and comparative examples of the present invention will be described with reference to the attached drawings.

Embodiment 1

Figure 1:
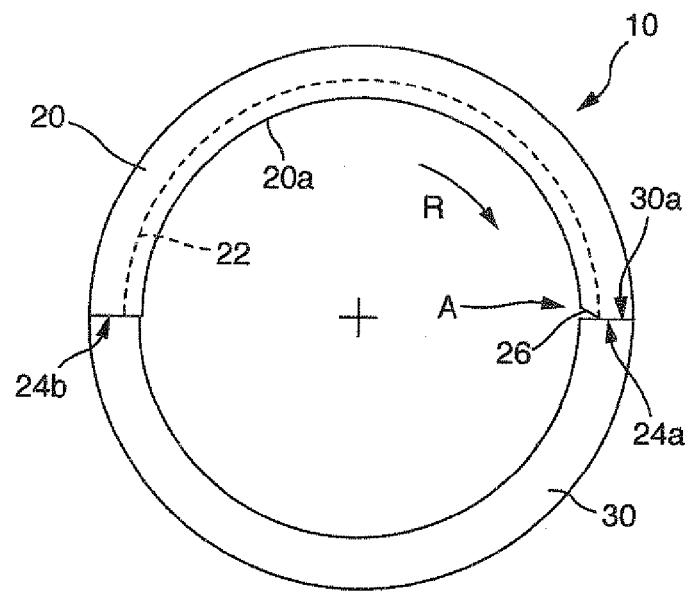
FIG. 1 is a front view of a sliding bearing for an internal combustion engine consisting of a pair of semi-cylindrical bearings according to embodiment 1 of the present invention.
Figure 2:
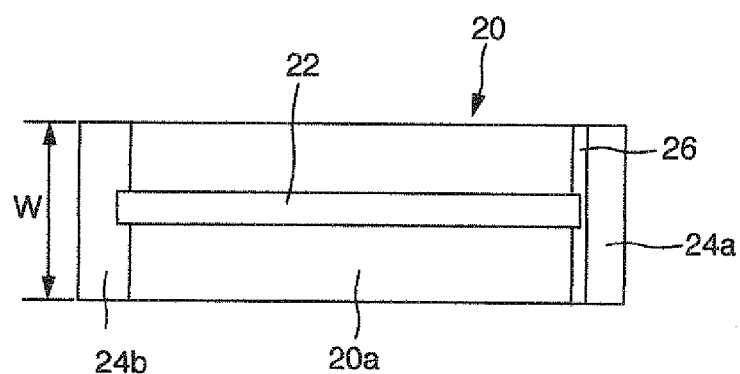
FIG. 2 is a drawing showing an inner surface of one of the pair of semi-cylindrical bearings shown in FIG. 1.
Figure 3:
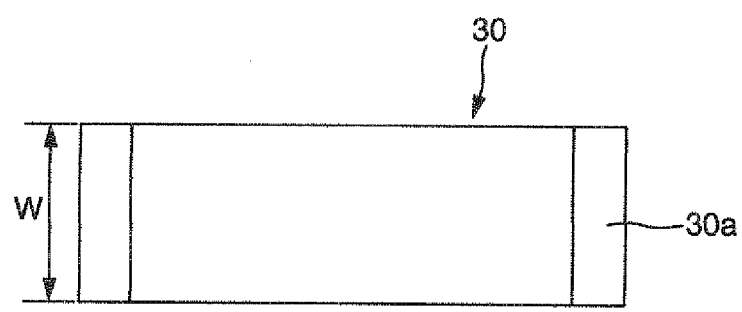
FIG. 3 is a drawing showing an inner surface of the other semi-cylindrical bearing shown in FIG. 1.

FIGS. 1 to 3 show a sliding bearing 10 according to embodiment 1 of the present invention. The sliding bearing 10 consists of a pair of semi-cylindrical bearings 20 and 30.

The semi-cylindrical bearing 20 has a circumferential oil groove 22 in a central position in the width direction thereof. The circumferential oil groove 22 is formed along a inner circumferential bearing surface 20*a* over a substantially overall circumferential length from a slant surface 26 described later to a circumferential end surface 24*b*. The distance between the groove bottom of the circumferential oil groove 22 and the inner circumferential bearing surface 20*a*, i.e. the groove depth, is constant over the overall length of the circumferential oil groove 22.

Further, in a circumferential end surface 24*a* of the semi-cylindrical bearing 20 (i.e. circumferential end surface of the semi-cylindrical bearing 20, which faces in the same direction as a rotational direction R of a crankshaft shown by the arrow R in FIG. 1), a slant surface 26 is formed by sectioning the corner portion at the side of the inner circumferential bearing surface 20*a* (namely, the bearing inner end edge portion) over the overall width (W) of the bearing. Meanwhile, a slant surface such as the slant surface 26 is not formed on a circumferential end surface 30*a* of the semi-cylindrical bearing 30, which abuts on the circumferential end surface 24*a*. Thus, the slant surface 26 and the circumferential end surface 30*a* of the semi-cylindrical bearing 30 define a groove having a V-shaped section, that is, an axial groove A. The axial groove A exists over the overall width of the bearing. The circumferential oil groove 22 is formed so that an open portion thereof (namely, a groove end) is opened to the slant surface 26 of the circumferential end surface 24*a* of the semi-cylindrical bearing 20. The circumferential oil groove 22 and the axial groove A communicate with each other in the vicinity of the circumferential end surfaces 24*a* and 30*a* of the semi-cylindrical bearings 20 and 30. In the communication portion, the relationship of the circumferential oil groove 22 and the axial groove A is such that the groove bottom of the circumferential oil groove 22 in the communication portion is at the position displaced to the side of the inner circumferential bearing surface 20*a* from the groove bottom of the axial groove A in the circumferential end surfaces 24*a* and 30*a* of the semi-cylindrical bearings 20 and 30 (that is, the groove depth of the circumferential oil groove 22 is smaller than the groove depth of the axial groove A), and the cross-sectional area of the circumferential oil groove 22 is made larger than the cross-sectional area of the axial groove A.

In such a configuration, when the crankshaft supported by the sliding bearing 10 rotates during the operation of the internal combustion engine, the lubricant oil flows with the rotation of the crankshaft (see the arrow R showing the rotational direction in FIG. 1) in the direction of the aforementioned arrow inside the circumferential oil groove 22 of the semi-cylindrical bearing 20. The lubricant oil changes the direction in the aforementioned communication portion, flows inside the axial groove A, and is released to the outside of the bearing from release portions at both ends of the axial groove A. The flow velocity of the lubricant oil is increased after the changing of the direction in the communication portion, since the cross-sectional area of the circumferential groove 22 is formed to be larger than the cross-sectional area of the axial groove A. Therefore, movement of the foreign particle which moves inside the circumferential oil groove 22 and enters the axial groove A by the lubricant oil flow is promoted, and the foreign particle is quickly discharged to the outside of the bearing. In addition, in the aforementioned communication portion, the groove depth of the circumferential oil groove 22 is formed to be smaller than the groove depth of the axial groove A in the circumferential end surfaces 24a and 30a of the semi-cylindrical bearings 20 and 30, and the foreign particle accompanying the flow of the lubricant oil directly enters the axial groove A. Therefore, discharge of the foreign particle to the outside of the bearing is promoted. This reduces the possibility of the foreign particle entering between the inner circumferential bearing surface (bearing sliding surface) 20a and the crankshaft and damaging the sliding surfaces of the both members.

In the present embodiment, the axial groove A is defined by the slant surface 26 in the circumferential end surface 24a of the semi-cylindrical bearing 20 and the circumferential end surface 30a in a normal shape of the semi-cylindrical bearing 30. However, a slant surface similar to the slant surface 26 may be formed symmetrically on the circumferential end surface 30a of the semi-cylindrical bearing 30, and the axial groove A may be defined by the both slant surfaces.

Embodiment 2

Figure 4:
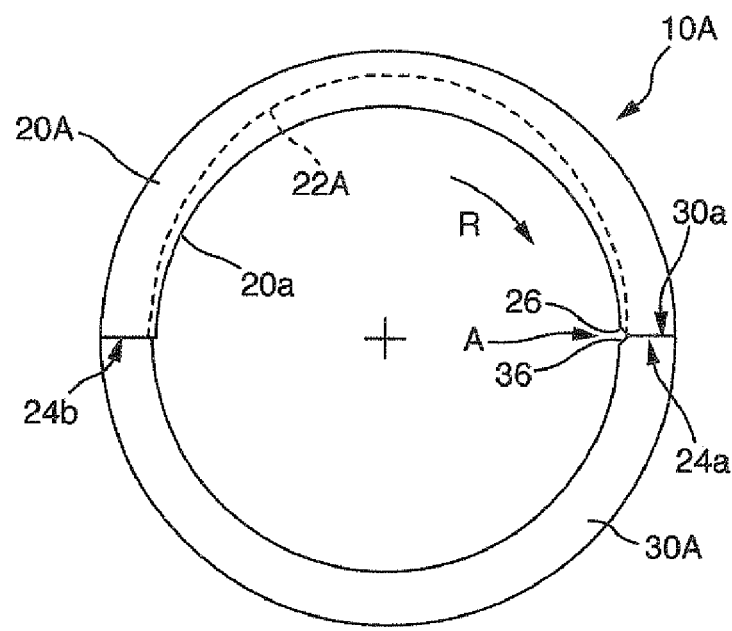
FIG. 4 is a front view of a sliding bearing for an internal combustion engine consisting of a pair of semi-cylindrical bearings according to embodiment 2 of the present invention.

FIG. 4 shows a sliding bearing 10A according to embodiment 2 of the present invention. The sliding bearing 10A consists of a pair of semi-cylindrical bearings 20A and 30A.

The semi-cylindrical bearing 20A has a circumferential oil groove 22A in a central position in the width direction thereof. The circumferential oil groove 22A is formed along a inner circumferential bearing surface 20a over a substantially overall circumferential length from the slant surface 26 described later to the circumferential end surface 24b. The distance between the groove bottom of the circumferential oil groove 22A and the inner circumferential bearing surface 20a, i.e. the groove depth, is the maximum at the central portion in the center of the circumferential length of the semi-cylindrical bearing 20A, and gradually becomes smaller toward the circumferential end surfaces 24a and 24b respectively.

Further, in the circumferential end surface 24a of the semi-cylindrical bearing 20A, a slant surface 26 is formed by sectioning a corner portion at the side of the inner circumferential bearing surface 20a (namely, the bearing inner end edge portion) over the overall width of the bearing. Meanwhile, a slant surface 36 similar to the slant surface of the aforementioned semi-cylindrical bearing 20A is also formed symmetrically on the circumferential end surface 30a of the semi-cylindrical bearing 30A, which abuts on the circumferential end surface 24a.

A groove having a V-shaped section, that is, the axial groove A is defined by the slant surfaces 26 and 36 facing each other. The axial groove A exists over the overall width of the bearing. The open portion of the circumferential oil groove 22A (namely, a groove end) is formed to open to the slant surface 26 of the circumferential end surface 24a of the semi-cylindrical bearing 20A. The circumferential oil groove 22A and the axial groove A communicate with each other in the vicinity of the circumferential end surfaces 24a and 30a of the semi-cylindrical bearings 20A and 30A. In the communication portion, the relationship of the circumferential oil groove 22A and the axial groove A is such that the groove bottom of the circumferential oil groove 22A in the communication portion is at the position displaced to the side of the inner circumferential bearing surface 20a from the groove bottom of the axial groove A in the circumferential end surfaces 24a and 30a of the semi-cylindrical bearings 20A and 30A (that is, the groove depth of the circumferential oil groove 22A is smaller than the groove depth of the axial groove A), and the cross-sectional area of the circumferential oil groove 22A is made larger than the cross-sectional area of the axial groove A.

The slant surfaces such as the slant surfaces 26 and 36 do not exist in the circumferential end surfaces at the opposite side of the semi-cylindrical bearings 20A and 30A.

A not-shown oil hole (through-hole) is formed in a central portion in the center of the circumferential length of the semi-cylindrical bearing 20A for supplying lubricant oil into the circumferential oil groove 22A inside the bearing from the outside of the bearing. Since the groove depth of the circumferential oil groove 22A is the maximum at the location where the oil hole exists, it is hard for a foreign particle accompanying the lubricant oil supplied into the circumferential oil groove 22A through the oil hole to depart from the circumferential oil groove 22A and to move to the outside of the circumferential oil groove 22A. Further, since the groove depth of the circumferential oil groove 22A is made gradually smaller toward the circumferential end surfaces 24a and 24b from the central portion in the center of the circumferential length, the flow velocity of the lubricant oil in the circumferential oil groove 22A is high at the position close to the circumferential end surface 24a, and the circumferential inertia force of the foreign particle accompanying the lubricant oil is also large. However, in the communication portion of the circumferential oil groove 22A and the axial groove A, the groove depth of the axial groove A in the communication portion is larger than the groove depth of the circumferential oil groove 22A in the circumferential end surfaces 24a and 30a of the semi-cylindrical bearings 20A and 30A. Therefore, the foreign particle directly enters the axial groove A. Due to the difference of the cross-sectional areas of the circumferential oil groove 22A and the axial groove A, the moving velocity of the foreign particles is higher in the axial groove A in which the lubricant oil flows at higher velocity. Therefore, the foreign particle is quickly discharged to the outside of the bearing. In the embodiment, the slant surfaces 26 and 36 are illustrated in the same shapes. However, the slant surfaces 26 and 36 do not necessarily have to be in the same shapes.

Embodiment 3

Figure 5:
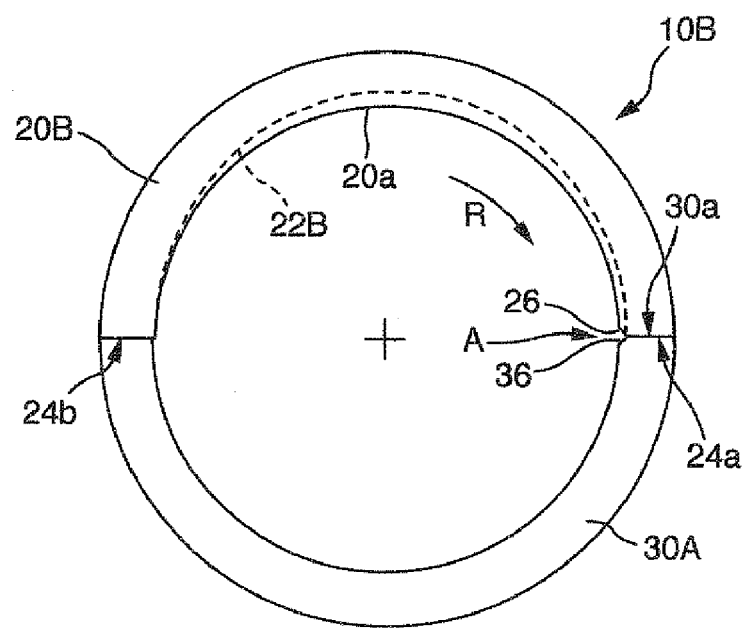
FIG. 5 is a front view of a sliding bearing for an internal combustion engine consisting of a pair of semi-cylindrical bearings according to embodiment 3 of the present invention.

FIG. 5 shows a sliding bearing 10B according to embodiment 3 of the present invention. The sliding bearing 10B consists of a pair of semi-cylindrical bearings 20B and 30A.

The semi-cylindrical bearing 20B has a circumferential oil groove 22B in a cenral position in the width direction thereof. The circumferential oil groove 22B is formed along the inner circumferential bearing surface 20a from the slant surface 26 described later to a position near the circumferential end surface 24b at the other side. The groove depth of the circumferential oil groove 22B is formed to be gradually smaller toward the circumferential end surfaces 24a and 24b respectively from the substantially central portion in the center of the circumferential length of the semi-cylindrical bearing 20B. However, the circumferential oil groove 22B does not reach the circumferential end surface 24b, while it extends to the circumferential end surface 24a. This is because a not-shown oil hole (through-hole) is formed in the central portion in the center of the circumferential length of the semi-cylindrical bearing 20B for supplying the lubricant oil into the circumferential oil groove 22B inside the bearing from the outside of the bearing, and the lubricant oil supplied into the circumferential oil groove 22B and accompanied with foreign particles flows toward the circumferential end surface 24a located in the same direction as the rotational direction R of the crankshaft shown by the arrow in FIG. 5.

Further, in the circumferential end surface 24a of the semi-cylindrical bearing 20B, a slant surface 26 is formed by sectioning a corner portion at the side of the inner circumferential bearing surface 20a (namely, the bearing inner end edge portion) over the overall width of the bearing. Meanwhile, the slant surface 36 similar to the slant surface of the aforementioned semi-cylindrical bearing 20B is also formed symmetrically on the circumferential end surface 30a of the semi-cylindrical bearing 30A, which abuts on the circumferential end surface 24a.

A groove having a V-shaped section, that is, the axial groove A is defined by the slant surfaces 26 and 36 facing each other. The axial groove A exists over the overall width of the bearing. The open portion of the circumferential oil groove 22B (namely, a groove end) is formed to open to the slant surface 26 of the circumferential end surface 24a of the semi-cylindrical bearing 20B. The circumferential oil groove 22B and the axial groove A communicate with each other in the vicinity of the circumferential end surfaces 24a and 30a of the semi-cylindrical bearings 20B and 30A. In the communication portion, the relationship of the circumferential oil groove 22B and the axial groove A is such that the groove bottom of the circumferential oil groove 22B in the communication portion is at the position displaced to the side of the inner circumferential bearing surface 20a from the groove bottom of the axial groove A in the circumferential end surfaces 24a and 30a of the semi-cylindrical bearings 20B and 30A (namely, the groove depth of the circumferential oil groove 22B is smaller than the groove depth of the axial groove A), and the cross-sectional area of the circumferential oil groove 22B is made larger than the cross-sectional area of the axial groove A.

The slant surfaces such as the slant surfaces 26 and 36 do not exist in the circumferential end surfaces at the opposite side of the semi-cylindrical bearings 20B and 30A.

The operational effect of the semi-cylindrical bearing 20B having the circumferential oil groove 22B and the axial groove A is equivalent to the operational effect of the semi-cylindrical bearing 20A of embodiment 2.

Embodiment 4

Figure 6:
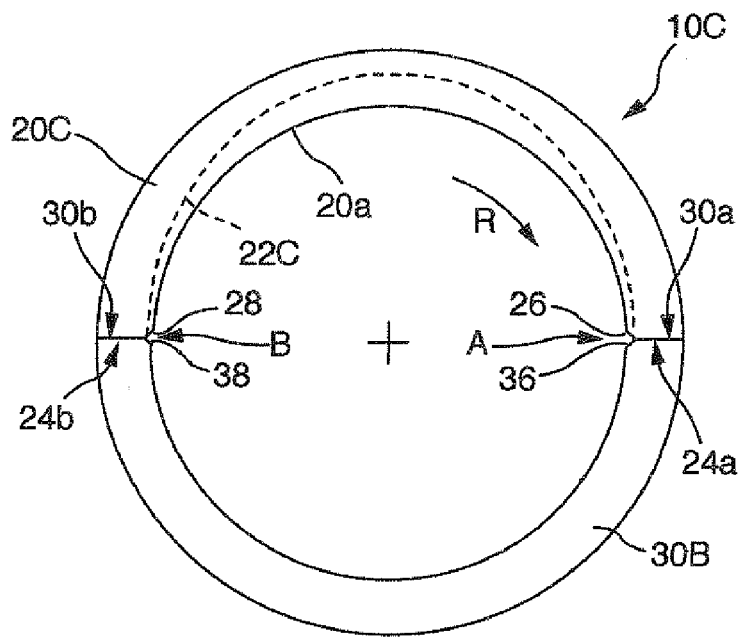
FIG. 6 is a front view of a sliding bearing for an internal combustion engine consisting of a pair of semi-cylindrical bearings according to embodiment 4 of the present invention.

FIG. 6 shows a sliding bearing 10C according to embodiment 4 of the present invention. The sliding bearing 10C consists of a pair of semi-cylindrical bearings 20C and 30B.

The semi-cylindrical bearing 20C has a circumferential oil groove 22C in a central position in the width direction thereof. The circumferential oil groove 22C is formed along the inner circumferential bearing surface 20a over the substantially overall circumferential length from the slant surface 26 described later to a slant surface 28. The groove depth of the circumferential oil groove 22C is formed to be gradually smaller toward the circumferential end surfaces 24a and 24b respectively from the central portion in the center of the circumferential length similarly to the circumferential oil groove 22A in embodiment 2.

Further, in the circumferential end surface 24a of the semi-cylindrical bearing 20C, a slant surface 26 is formed by sectioning a corner portion at the side of the inner circumferential bearing surface 20a (namely, the bearing inner end edge portion) over the overall width of the bearing. Meanwhile, the slant surface 36 similar to the slant surface 26 of the semi-cylindrical bearing 20C is also formed symmetrically on the circumferential end surface 30a of the semi-cylindrical bearing 30B, which abuts on the circumferential end surface 24a. Thus, a groove having a V-shaped section, that is, the axial groove A is defined by the slant surfaces 26 and 36. The axial groove A exists over the overall width of the bearing.

The shape of each of the grooves along the inner circumferential bearing surface of the semi-cylindrical bearing 20C is bilaterally symmetrical in FIG. 6. Slant surfaces 28 and 38 similar to the slant surfaces 26 and 36 are also formed on the circumferential end surfaces 24b and 30b located at the opposite side from the circumferential end surfaces 24a and 30a, and a V-shaped axial groove B is formed similar to the axial groove A.

The operational effect intended by the sliding bearing 10C is also equivalent to the operational effects of the aforementioned embodiments 2 and 3. The semi-cylindrical bearings 20C and 30B are formed into bilaterally symmetrical shapes in FIG. 6, in case the relationship of the semi-cylindrical bearings 20C and 30B with respect to the crankshaft is mistaken in the assembling. In such a case, the intended operational effect to exclude a foreign substance accompanying the lubricant oil to the outside of the bearing cannot be obtained with the asymmetrical structure provided with the single axial groove A such as the sliding bearings 10A and 10B in embodiments 2 and 3. More specifically, the axial groove B is formed along the circumferential end surface 24b of the semi-cylindrical bearing 20C facing in the direction opposite from the rotational direction of the crankshaft (see the arrow R in FIG. 6). Therefore, the operational effect intended by the present invention cannot be obtained by the axial groove B.

Figure 7:
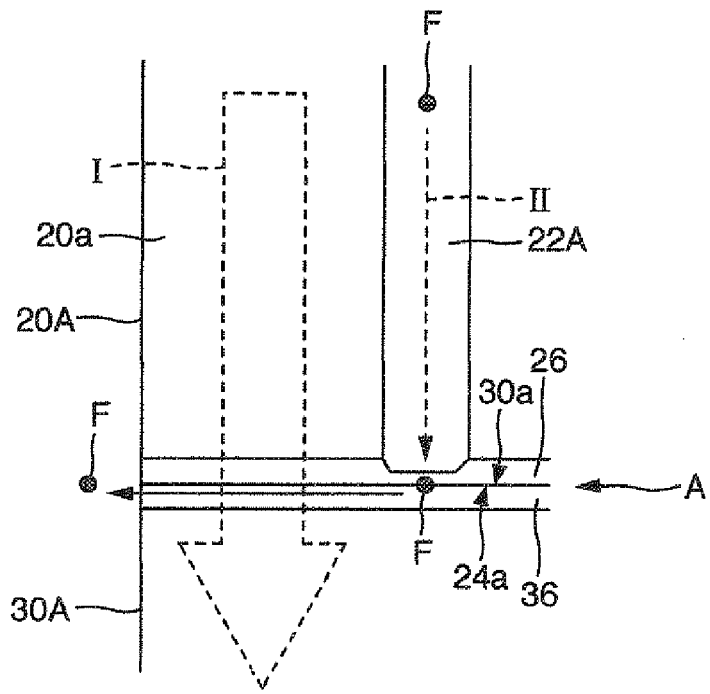
FIG. 7 is a supplementary explanatory diagram (showing a part of a inner circumferential bearing surface) concerning the function of the sliding bearing of the present invention.

Supplementary Description Concerning the Function of the Sliding Bearing of the Present Invention Description will be made with reference to FIG. 7. FIG. 7 is a diagram of the axial groove A of the sliding bearing 10A shown in FIG. 4, for example, seen from the side of the bearing inner surface.

In the drawing, an arrow I shows the flow direction of the lubricant oil supplied into the circumferential oil groove 22A through the oil hole located in the central portion in the circumferential direction of the semi-cylindrical bearing 20A and flowing toward the circumferential end surface 24a with the rotation of the crankshaft. Not all the lubricant oil flow inside the circumferential oil groove 22A. It also enters the inner circumferential bearing surface outside the circumferential oil groove 22A and flows as shown by the arrow I. An arrow II shows the moving direction of a foreign particle F.

The foreign particle F accompanying the lubricant oil rolls along the groove bottom of the circumferential oil groove 22A, moves toward the circumferential end surface 24a together with the lubricant oil, and reaches the communication portion of the circumferential oil groove 22A and the axial groove A. In the communication portion, the groove depth of the axial groove A in the circumferential end surface 24a of the semi-cylindrical bearing 20A is formed to be large as compared with the groove depth of the circumferential oil groove 22A in the communication portion, and the open portion (groove end) of the circumferential oil groove 22A is formed on the slant surface 26. Therefore, there is no trouble that a (groove bottom side) part of the open portion (groove end) of the circumferential oil groove is blocked by the circumferential end surface 30a of the semi-cylindrical bearing 30A which does not form the circumferential oil groove. Therefore, the foreign substance reaches the communication portion, and directly enters the axial groove A without floating up to the inner circumferential surface side of the bearing. Further, in the communication portion, the cross-sectional area of the axial groove A is formed to be smaller than the cross-sectional area of the circumferential oil groove 22A. Therefore, the flow velocity of the lubricant oil which changes the direction from the circumferential oil groove 22A and flows to the inside of the axial groove A is increased in the axial groove A. Accordingly, the foreign particle reaching the communication portion rides on the flow of the lubricant oil with the increased velocity in the axial groove A, and is quickly discharged to the outside of the bearing. As described above, the moving speed of the foreign particle in the axial groove A is so high that it is hardly influenced by the lubricant oil flow along the inner circumferential bearing surface 20a shown by the arrow I. Therefore, the phenomenon can be suppressed that the foreign particle is pushed out from the axial groove A and moves to the side of the semi-cylindrical bearing 30A with the lubricant oil flow. Further, when the groove depth of the axial groove A is made large, and/or the groove width of the axial groove A is made small in the communication portion, the influence of the lubricant oil flow I on the foreign particle can be reduced correspondingly.

Figure 8:
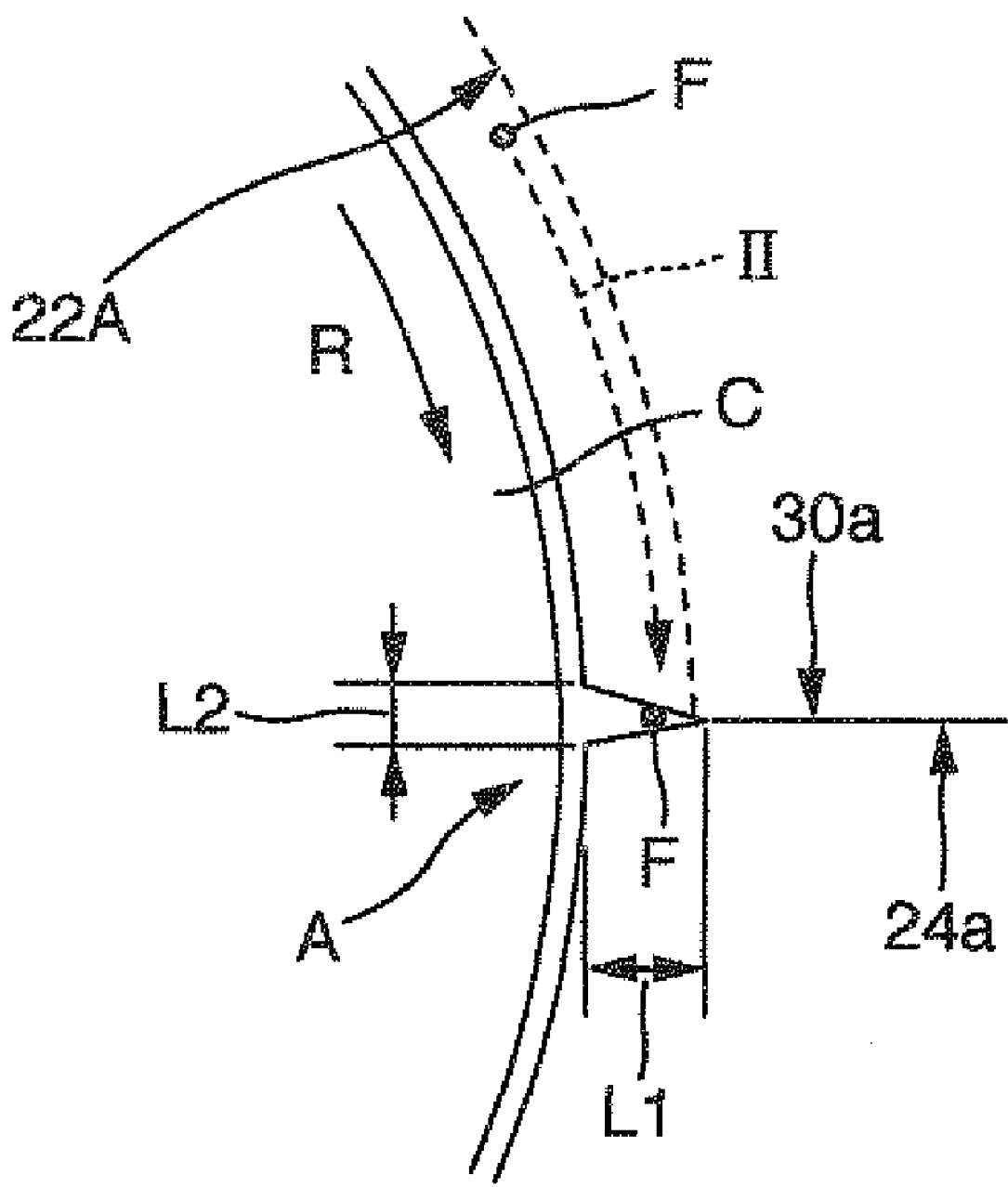
FIG. 8 is another supplementary explanatory diagram concerning the function of the sliding bearing of the present invention.

FIG. 8 shows such a condition. In the drawing, a crankshaft is indicated by C, the groove depth of the axial groove A is represented by L1, and the groove width is represented by L2. When the relationship of L1 and L2 is set as $2 \times L1 > L2$ so that the groove width of the axial groove is set to be small and the groove depth of the axial groove A is set to be large, the influence of the lubricant oil flow I on the foreign particle in the axial groove A can be sufficiently reduced. When the relationship of L1 and L2 is set to be $L1 > L2$, more desirable effect can be obtained. Preferably, the aforementioned relationship of L1 and L2 is set in the range of the groove depth L1 of the axial groove of not less than 0.15 mm and the groove width L2 of not more than 1 mm.

The invention claimed is:

1. A sliding bearing for an internal combustion engine, comprising a pair of semi-cylindrical bearings combined with each other into a cylindrical body to support a crankshaft, a circumferential oil groove being formed to extend in a circumferential direction on an inner circumferential surface of one of the semi-cylindrical bearings, wherein the circumferential oil groove includes a central portion in the center of a circumferential length of the one of the semi-cylindrical bearings, wherein along an overall axial length of at least one of both circumferential end surfaces of the one of the semi-cylindrical bearings, facing in a same direction as a rotational direction of the crankshaft, an axial groove exists between the circumferential end surface and an opposite circumferential end surface of the other semi-cylindrical bearing, wherein the axial groove is defined by a slant surface formed over an overall axial width of the sliding bearing, along the inner circumferential surface and the one of the circumferential end surfaces of at least one of the semi-cylindrical bearings, wherein the circumferential oil groove and the axial groove communicate with each other, depths of the circumferential oil groove in the communication portion and the axial groove in the one of the circumferential end surfaces being different from each other, and a groove bottom of the circumferential oil groove being located at a position displaced to a side of the inner circumferential bearing surface from a groove bottom of the axial groove, and wherein a cross-sectional area of the circumferential oil groove in the communication portion is larger than a cross-sectional area of the axial groove.

2. The sliding bearing for an internal combustion engine according to claim 1, wherein a relationship of a groove width (L2) and a groove depth (L1) of the axial groove satisfies $L2 < 2 \times L1$.

3. The sliding bearing for an internal combustion engine according to claim 1, wherein a relationship of a groove width (L2) and a groove depth (L1) of the axial groove satisfies $L2 < L1$.

4. The sliding bearing for an internal combustion engine according to claim 1, wherein the cross-sectional area of the axial groove in the communication portion is less than ½ of the cross-sectional area of the circumferential oil groove.

5. The sliding bearing for an internal combustion engine according to claim 1, wherein the circumferential oil groove is formed on the inner circumferential bearing surface of the one of the semi-cylindrical bearings over an overall circumferential length of the inner circumferential bearing surface, and wherein the shapes of the circumferential oil groove and the axial groove are formed plane-symmetrically on the basis of a phantom plane including an axial line of the sliding bearing and passing through a position dividing the circumferential length of the one of the semi-cylindrical bearings into two equal lengths.

6. The sliding bearing for an internal combustion engine according to claim 1, wherein the groove depth of the circumferential oil groove is formed to be a maximum at the central portion in the center of the circumferential length and to be gradually smaller toward both the circumferential end surfaces, and whereby the cross-sectional area of the circumferential oil groove is a maximum at the central portion in the center of the circumferential length, and becomes gradually smaller toward both the circumferential end surfaces.

7. The sliding bearing for an internal combustion engine according to claim 1, wherein the axial groove includes a crush relief provided along the inner circumferential bearing surface adjacent to each of the circumferential end surfaces of the pair of semi-cylindrical bearings.

* * * * *